Aug. 16, 1955  S. E. ROSE ET AL  2,715,324
AIR CONDITIONING APPARATUS HAVING CONTROL MEANS
Filed April 19, 1954  7 Sheets-Sheet 1

*INVENTOR.*
STANLEY E. ROSE &
ELMER E. HEIMO
BY
THEIR ATTORNEY

Aug. 16, 1955 S. E. ROSE ET AL 2,715,324
AIR CONDITIONING APPARATUS HAVING CONTROL MEANS
Filed April 19, 1954 7 Sheets-Sheet 2

INVENTOR.
STANLEY E. ROSE &
ELMER E. HEIMO
BY
THEIR ATTORNEY

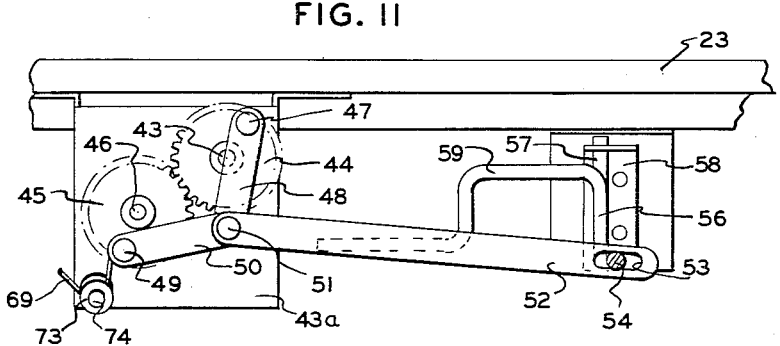
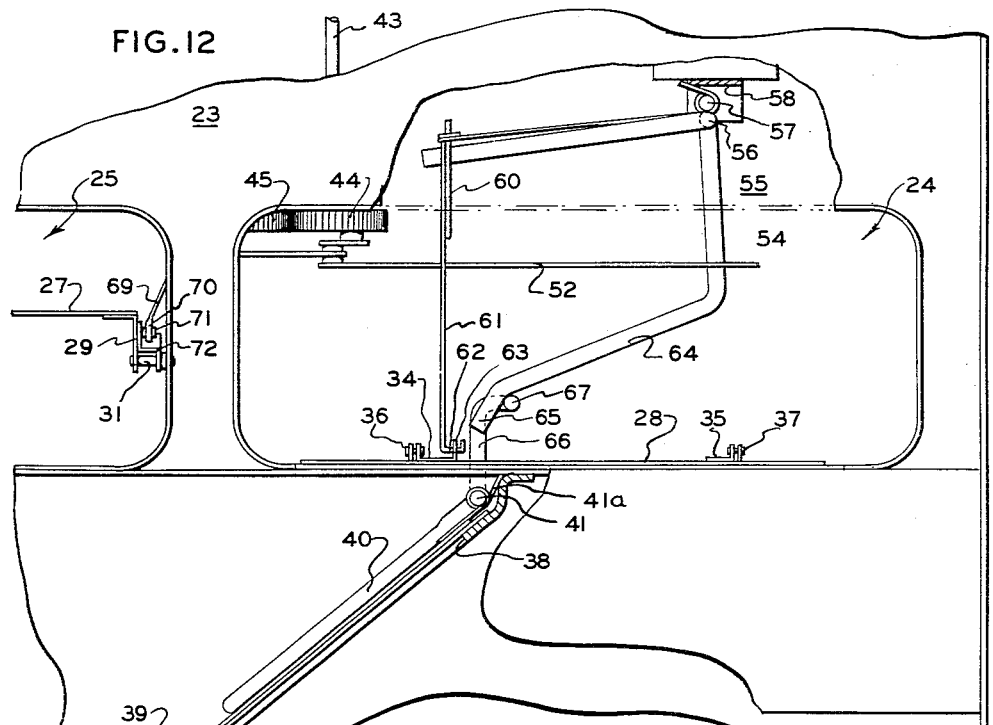
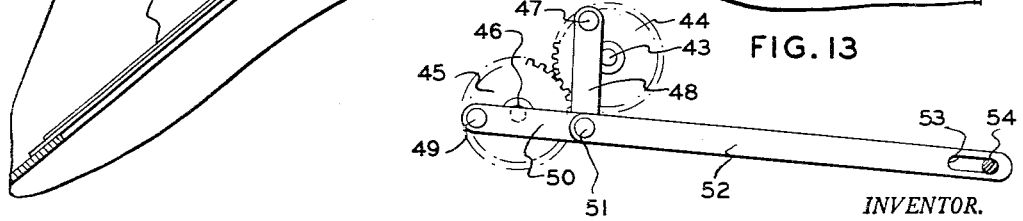

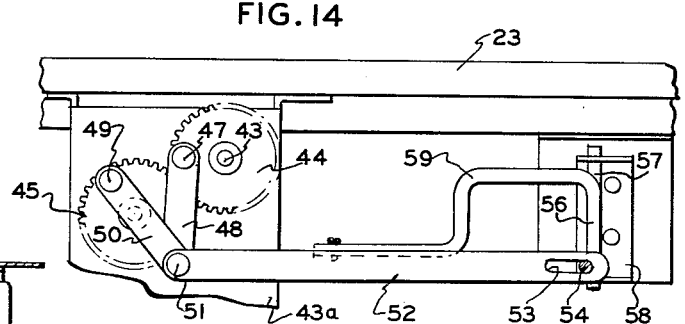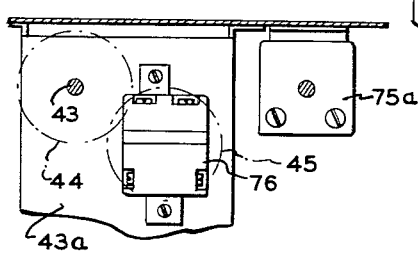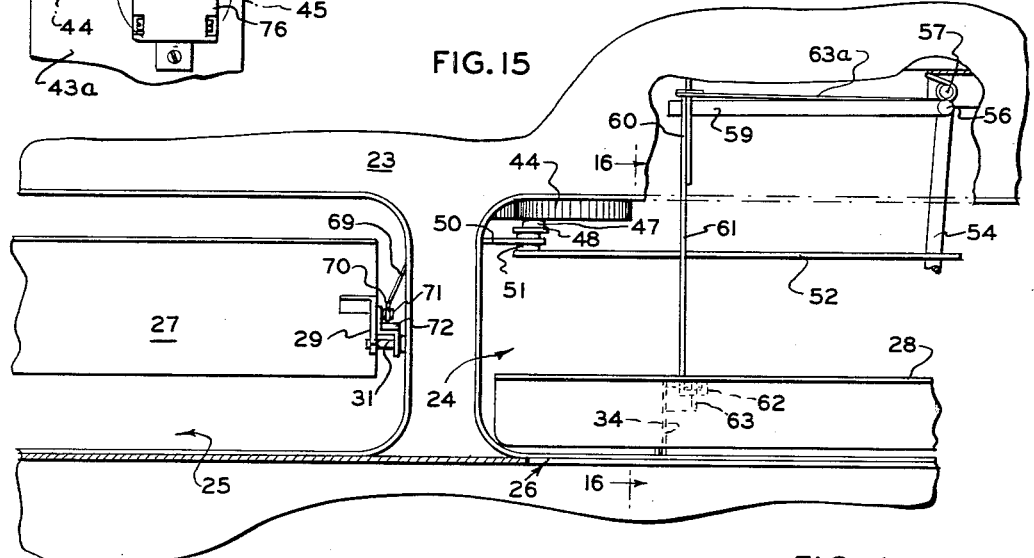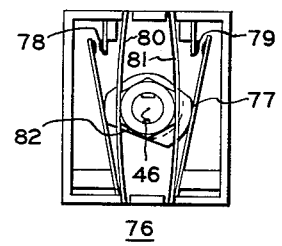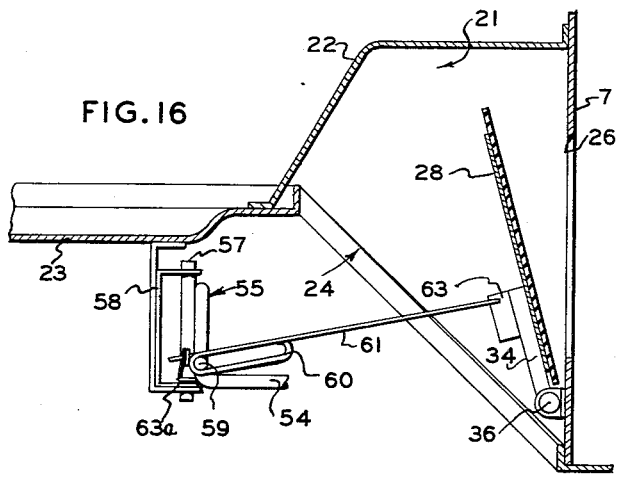

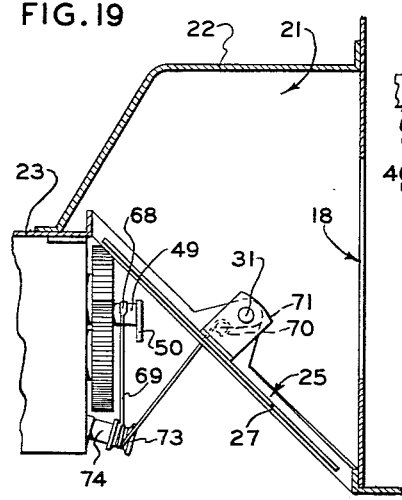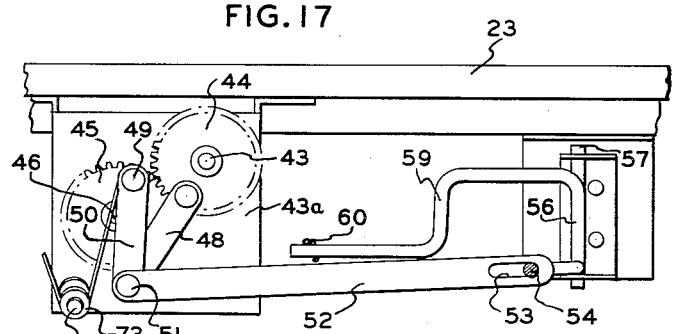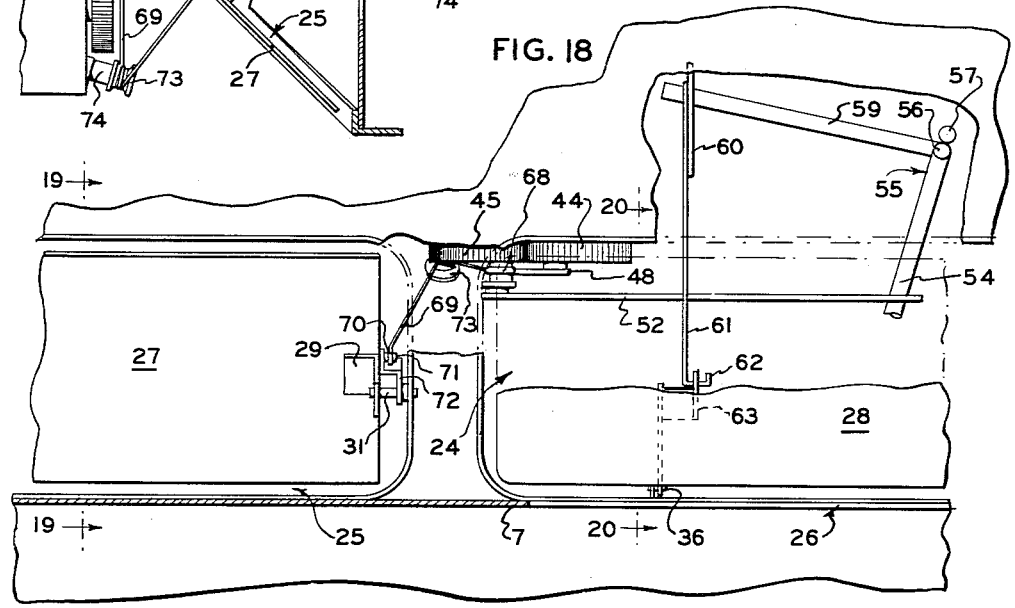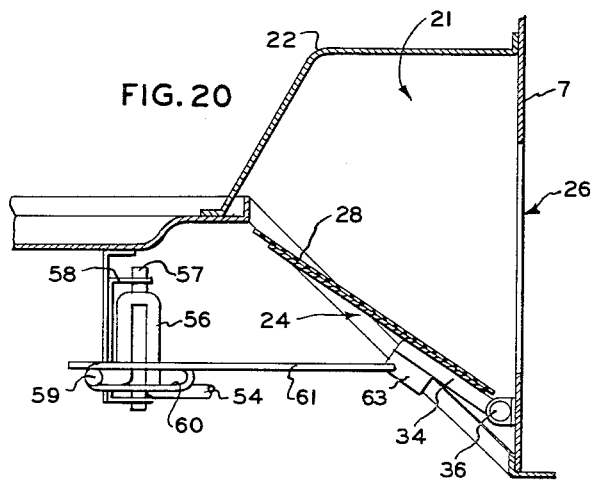

Aug. 16, 1955     S. E. ROSE ET AL     2,715,324
AIR CONDITIONING APPARATUS HAVING CONTROL MEANS
Filed April 19, 1954     7 Sheets-Sheet 6

*INVENTOR.*
STANLEY E. ROSE &
ELMER E. HEIMO

BY
THEIR ATTORNEY

Aug. 16, 1955    S. E. ROSE ET AL    2,715,324
AIR CONDITIONING APPARATUS HAVING CONTROL MEANS
Filed April 19, 1954    7 Sheets-Sheet 7

*INVENTOR.*
STANLEY E. ROSE &
ELMER E. HEIMO
BY
THEIR ATTORNEY

United States Patent Office 2,715,324
Patented Aug. 16, 1955

2,715,324

AIR CONDITIONING APPARATUS HAVING CONTROL MEANS

Stanley E. Rose and Elmer E. Heimo, Erie, Pa., assignors to General Electric Company, a corporation of New York Application April 19, 1954, Serial No. 424,072

25 Claims. (Cl. 62—129)

Our invention relates to air conditioning apparatus and more particularly to those self-contained air conditioning units commonly known as room air conditioners.

It is a primary object of our invention to provide a new and improved self-contained room air conditioner.

It is another object of our invention to provide new and improved manually operable control means for adjusting a room air conditioner between various conditioning operations.

Another object of our invention is to provide improved porting and passageway means for conducting and controlling the air flow through a room air conditioner.

A further object of our invention is to provide an improved damper arrangement for controlling the air flow to and from the blower means of a room air conditioner.

Still another object of our invention is to provide an improved control for simultaneously adjusting the electrical and mechanical components of a room air conditioner to obtain different conditioning effects.

A still further object of our invention is to provide an improved air conditioner control including a single master control knob rotatable in either direction to or from any position thereof.

Another object of our invention is to provide an improved air conditioner having a single master control, which includes novel means for releasably retaining the control knob and the elements controlled thereby in a plurality of predetermined settings each effective to cause a different conditioning effect by the air conditioner.

Our invention also has as its object the provision of a new and improved linkage for operating a plurality of air flow dampers in a room air conditioner from a single rotatable control knob.

In carrying out our invention in one preferred form thereof we provide a room air conditioner in which all the mechanical and electrical components are mounted within a single housing. This housing is divided by a barrier into inner and outer compartments. The evaporator or cooling means of the conditioner are mounted in the inner compartment and the compressor and condenser, i. e. the condensing unit, of the conditioner are mounted in the outer compartment. Also mounted in the inner compartment or in communication therewith is a blower means for creating a flow of air to and/or from the conditioned room. Means included in the inner compartment define both an intake passageway leading to the intake of this blower means and an exhaust passageway leading from the output or exhaust of the blower means through the evaporator to the room.

For admitting room air into the intake passageway there are provided a pair of room air intake ports which open from the room into the passageway; and for admitting air from without the room there is provided an outside air intake port which comprises an aperture in the aforesaid barrier, this aperture opening into the intake passageway. A first movable damper is positioned for controlling the flow through one of the room air intake ports and a second movable damper is positioned for controlling the flow both through the other of the room air intake ports, and the outside air intake port. For allowing the discharge of the blower means to be exhausted from the room as well as being discharged into the room an exhaust port is provided in the exhaust passageway. This exhaust port comprises a second aperture in the barrier opening from the exhaust passageway into the outer compartment of the conditioner. An additional movable damper is provided for directing the blower outlet stream either through this exhaust port or outwardly into the room. By adjusting these dampers and by turning on and off the aforesaid blower means and condensing unit, our new and improved air conditioner may be adjusted so as to produce different conditioning effects.

In our preferred embodiment, the dampers, the blower means and the condensing unit are all controlled simultaneously by a manually operated means which comprises a further aspect of our invention. This control means includes a single master control knob which is operatively connected to the dampers and to the switch means controlling the blower means and the condensing unit. The connections between the knob and the dampers and the switch means are such that the control knob may be moved in either direction from any position thereof to any other position to adjust the operation of the conditioner.

In our preferred control the aforesaid switch means are operated by a single rotatable shaft which is operable to a plurality of positions. In each of these positions the shaft operates the switch contacts in a predetermined manner so as to effect the desired operations of the condensing unit and the blower means. The switch means further includes motion restraining means which are effective to releasably retain the switch control shaft in each of its positions; and by our invention the switch control shaft is connected to the master control knob by means of a plurality of positively engaged members so that the motion restraining means of the switch control shaft also releasably restrain the control knob in a plurality of positions corresponding to the positions of the switch. Further, the connections between the dampers and the control knob are such that they too are maintained in positive positions correlated with the positions of the switch operating shaft. In other words through the action of the motion restraining means of the switch control shaft a plurality of clearly distinguishable settings or positions are provided during the rotation of the master control knob. The linkages connecting the dampers and the control knob are so constructed that at each of these definite settings a predetermined positioning of the dampers is obtained, which positioning is so correlated with the accompanying operations of the condensing unit and the blower means as determined by the switch that a different conditioning effect is produced by the unit in each of the settings. As mentioned above, our preferred linkages between the control knob and the dampers are such that the control knob may be rotated in either direction from any of these settings to any other setting.

The novel features which we believe to be characteristic of our invention, are set forth with particularity in the appended claims. Our invention, however, both as to its organization and method of operation may be best understood by reference to the following description taken in conjunction with the accompanying drawings in which:

Fig. 4 is a view of the switch means for controlling the blower means and the condensing unit of the conditioner;

Fig. 11 is a fragmentary view from the rear showing our novel air conditioner control means in its setting where the conditioner is turned "off";

Fig. 12 is a fragmentary view from above showing the position of the air flow dampers effected by the "off" setting of the conditioner control means;

Fig. 13 is a fragmentary view from the rear showing the air conditioner control means in its "cool" setting;

Fig. 14 is a fragmentary view from the rear showing the air conditioner control means in its "cool-vent" setting;

Fig. 15 is a fragmentary view from above showing the positions of room air inlet dampers and the outside air inlet damper during the "cool-vent" operation of the conditioner;

Fig. 16 is a fragmentary sectional view taken along the line 15—15 of Fig. 15;

Fig. 17 is a fragmentary view from the rear showing the air conditioner control means in its "vent" setting;

Fig. 18 is a fragmentary view from above showing the position of the room air inlet dampers and the outside air inlet damper during the "vent" operation of the conditioner;

Fig. 19 is a fragmentary sectional view taken on the line 19—19 of Fig. 18;

Fig. 20 is a fragmentary view taken on the line 20—20 of Fig. 18;

Fig. 26 is a fragmentary view from the front showing the manner in which the switch of Fig. 4 is mounted as part of the control means.

Figure 1:
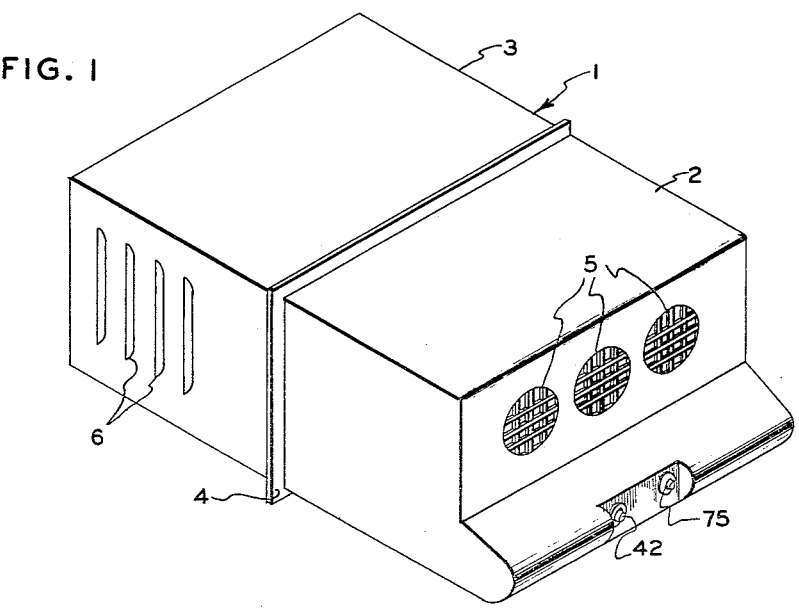
Fig. 1 is a perspective view of our new and improved air conditioner.

Referring now to Fig. 1 we have shown therein a preferred embodiment of our invention in the form of a self-contained room air conditioner 1. The conditioner 1 is adapted for mounting in a window of the room to be conditioned and includes a section 2 projecting into the room and an outer section 3 projecting without the room. The housing of the conditioner is preferably divided into two separate sections, an inner section covering the inner portion 2 of the conditioner and an outer section covering the outer portion 3 of the conditioner. A gasket 4 is provided intermediate these housing sections to prevent leakage of the outside air into the room. The inner housing section includes a plurality of screened openings 5 through which conditioned air is discharged into the room and the outer housing section contains a plurality of slots or openings 6 through which outside air may be drawn into the outer portion of the conditioner. Although in Fig. 1 the slots 6 are shown only on the one side of the outer housing section, it will be understood that they are also provided at the rear of the outer section and also in its other side.

Figure 2:
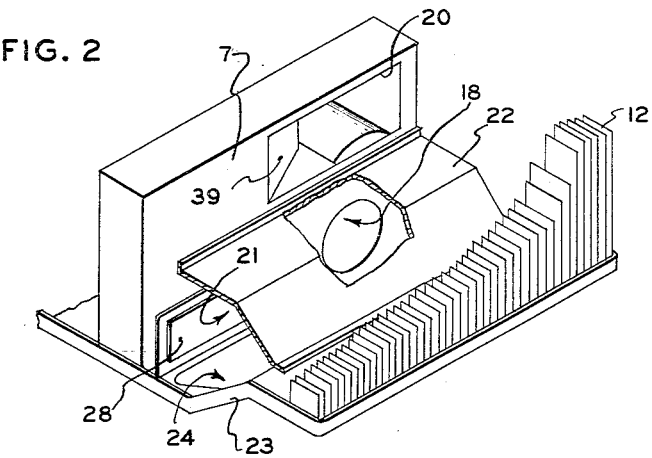
Fig. 2 is a perspective view of the inner compartment of the air conditioner with the housing removed, certain members positioned in the inner compartment being broken away to show the inlet and outlet of the blower means of the conditioner.
Figure 3:
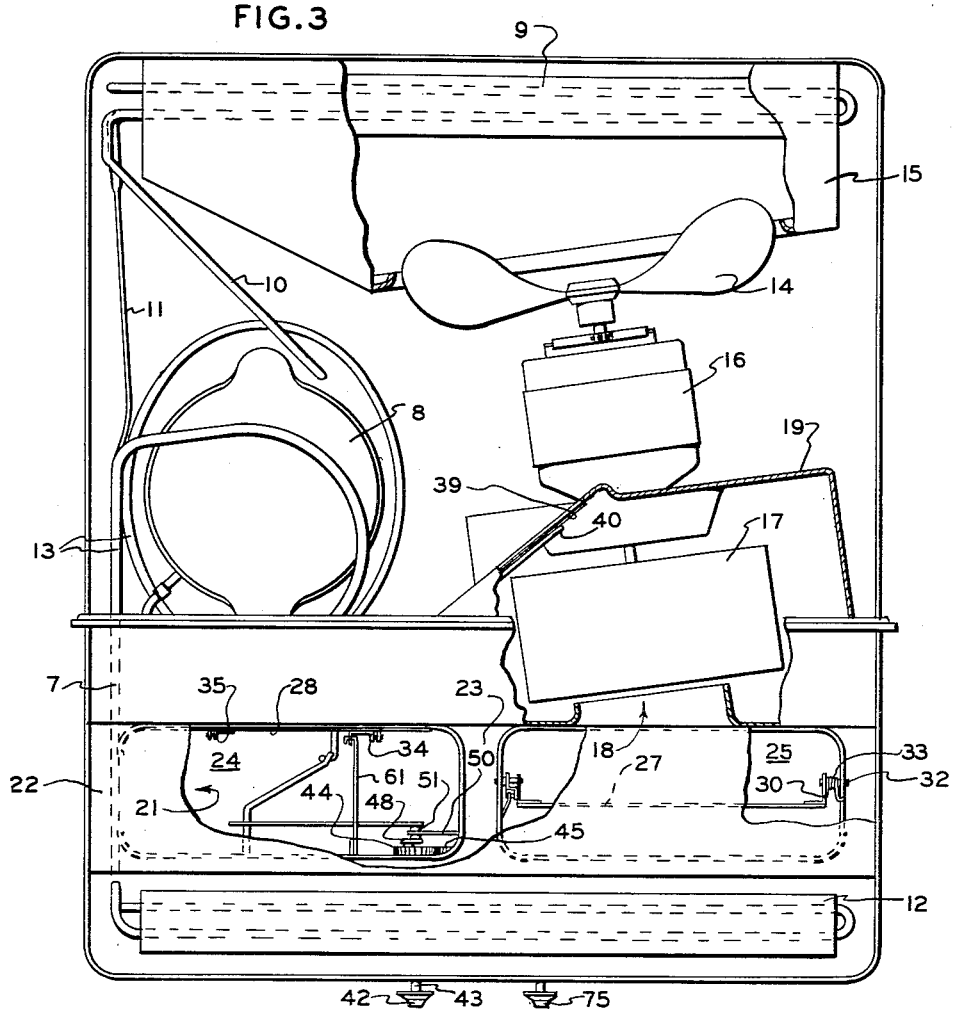
Fig. 3 is a plan view of the conditioner with the housing removed, certain members of the conditioner being broken away to show the air flow dampers of the conditioner and their operating means.

Referring now to Figs. 2 and 3 it will be seen that the conditioner 1 includes within its housing a barrier 7 which divides the space within the housing into an inner compartment and an outer compartment. Within the outer compartment corresponding to the portion 3 of the conditioner is positioned the refrigeration condensing unit of the conditioner. This condensing unit comprises a refrigeration compressor 8 and a condenser 9 connected together by means of a compressor exhaust line 10. The condenser 9 is connected by means of a capillary tube 11 to an evaporator 12 positioned in the inner compartment of the conditioner and the evaporator 12 is in turn connected to the compressor through the compressor suction line 13. Through the operation of this refrigeration system, heat picked up by the evaporator 12 from air flowing therethrough is rejected without the room by means of the condenser 9.

In order to aid in the rejection of heat by the condenser 9 there is also mounted in the outer compartment a fan 14 which blows a stream of outside air over the condenser. The fan 14 pulls in air through the slots in the sides of the outer portion of the compressor housing and discharges it through the slots in the rear of the housing. A fan shroud 15 directs the exhaust of the fan over the condenser. The fan 14 is driven by a motor 16 also mounted in the outer compartment, the controls for this motor to be explained hereinafter.

As thus far described, however, this air conditioner with its two separate compartments and condensing means positioned in the outer compartment is not our invention, but rather is intended only to be illustrative of the type of air conditioners to which our invention may be adapted. As will now be explained our invention deals with the construction of the inner compartment and the means incorporated therein for applying different conditioning effects to the room into which the inner portion 2 projects.

In order to apply a conditioning effect to the room there is positioned in communication with the inner compartment a blower means, as for example the centrifugal blower 17. This blower 17 may be driven by any suitable means but preferably is driven by the motor 16 of the condenser fan. As shown in both Figs. 2 and 3 the blower 17 is so positioned that its intake air is taken through an aperture or passageway 18 in the baffle 7, with the blower itself lying on the outer side of the baffle. However, the blower is surrounded by a housing or scroll 19 which is affixed to the rear of the baffle, and this housing completely separates the blower from the outer compartment of the conditioner. The air taken in by the blower through the intake 18 is accelerated thereby and discharged through the exhaust or outlet opening 20 of the scroll. This outlet opening of the scroll is coincident with a second aperture in the baffle 7, so that like its intake the outlet of the blower is also connected to the inner compartment. Thus in actual effect the blower 17 may be said to be positioned within the inner compartment, and for simplicity's sake will be hereinafter referred to as being so positioned.

In accordance with our invention there is provided within the inner compartment of the conditioner an intake passageway 21 for carrying air to the intake 18 of the blower. As may be best seen in Figs. 2, 16, 19, 20, and 23 this intake passageway extends across the compartment parallel to baffle 7 and is defined by a baffle member 22, the lower frame member 23 of the conditioner, and the lower portion of the baffle 7. The conditioner housing closes the passageway at both its ends. The baffle member 22 which comprises the upper wall of this passageway is a solid member which is attached at its rear end to the baffle plate 7 just below the blower exhaust port 20. It extends downwardly and forwardly therefrom to its front end where it is attached to the frame member 23 of the conditioner. As will be explained hereinafter this baffle 22 also serves as one wall of the exhaust passageway for the air leaving blower 17.

For bringing air into the intake passageway 21 there are provided a plurality of openings or ports in the walls thereof. Specifically, a pair of ports are provided for bringing room air into the passageway and an outside air port is provided for bringing outside air into the passageway. The room air ports comprise the openings 24 and 25 in the frame member 23 which open from the room directly into the passageway. The outside air intake port comprises an opening or aperture 26 in the baffle 7 which opens from the outer compartment of the conditioner into the passageway. Room air may of course flow directly into the intake passageway through the ports 24 and 25 but the outside air flowing into the passageway through port 26 must first flow inwardly through the slots 6 in the outer housing into the outer compartment of the conditioner and thence through port 26 into the intake passageway.

Figure 23:
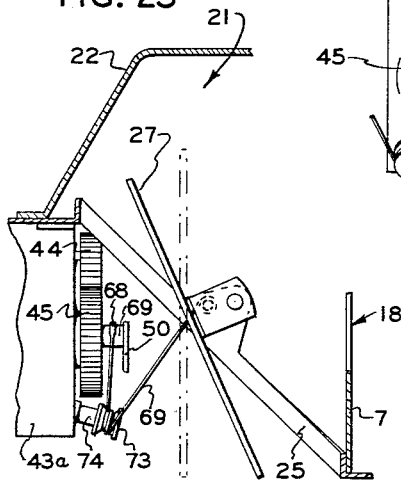
Fig. 23 is a fragmentary sectional view taken along the line 23—23 of Fig. 22.

For controlling the flow of air through these ports and thus for controlling the conditioning effect applied to the room we have provided a plurality of damper means cooperable with the various ports. As shown in Fig. 3 and in various of the fragmentary views a damper 27 is mounted for controlling the flow through room air intake port 25 and a second damper 28 is mounted for controlling the flow both through room air intake port 24 and through the outside air intake port 26. The damper 27 is pivoted to the frame member 23 at its opposite ends respectively by means by brackets 29 and 30 and pivot pins 31 and 32. The brackets 29 and 30 are mounted at approximately the longitudinal center line of the damper so that it in effect is pivoted as a butterfly damper. Further a spring 33 is provided around the pivot pin 32, which engages the frame 23 and the bracket 30 to bias damper 27 to its full open position. This full open position is, for example, shown in both Figs. 3 and 11. Other positions of the damper 27 are shown in Figs. 19 and 23 wherein it respectively closes and partially closes port 25.

The second intake air control damper 28 is however not mounted as a butterfly damper but rather is pivoted as a flap valve. Thus, as may be seen in Figs. 3 and 12 the damper 28 has attached thereto at its opposite ends a pair of brackets 34 and 35. These brackets extend downwardly below the lower end of the damper 28 and are there pivoted by means of pivot pins 36 and 37 to mounting members attached to the baffle 7. As shown in Fig. 12 and as will be more fully explained hereinafter, the damper 28 is normally spring biased to a position against baffle 7 wherein it completely shuts off the port 26. But as shown in Figs. 15 and 16 it may be moved to an intermediate position wherein it only partially blocks port 26 and at the same time partially blocks room air port 24. Further as shown in Fig. 20 it may be moved to still another position wherein it offers substantially no restriction whatsoever to the flow of outside air through port 26 but completely blocks the room air port 24.

Besides these means for controlling the intake air flow to blower 17 we have also provided means for controlling the discharge air flow of the blower. Specifically we have provided within the inner compartment a discharge passageway which leads from the outlet opening 20 of the blower through the evaporator 12 and the openings 5 into the room. Specifically the walls of this passageway comprise the baffle 22 and the top and side walls of the housing. In other words the air stream leaving the discharge opening 20 is confined between the walls of the housing and the baffle 22 so that it flows outwardly through the evaporator 12 and outlet openings 5. In passing through the evaporator 12 the air stream is cooled so that it will condition the room upon entering thereinto.

Figure 22:
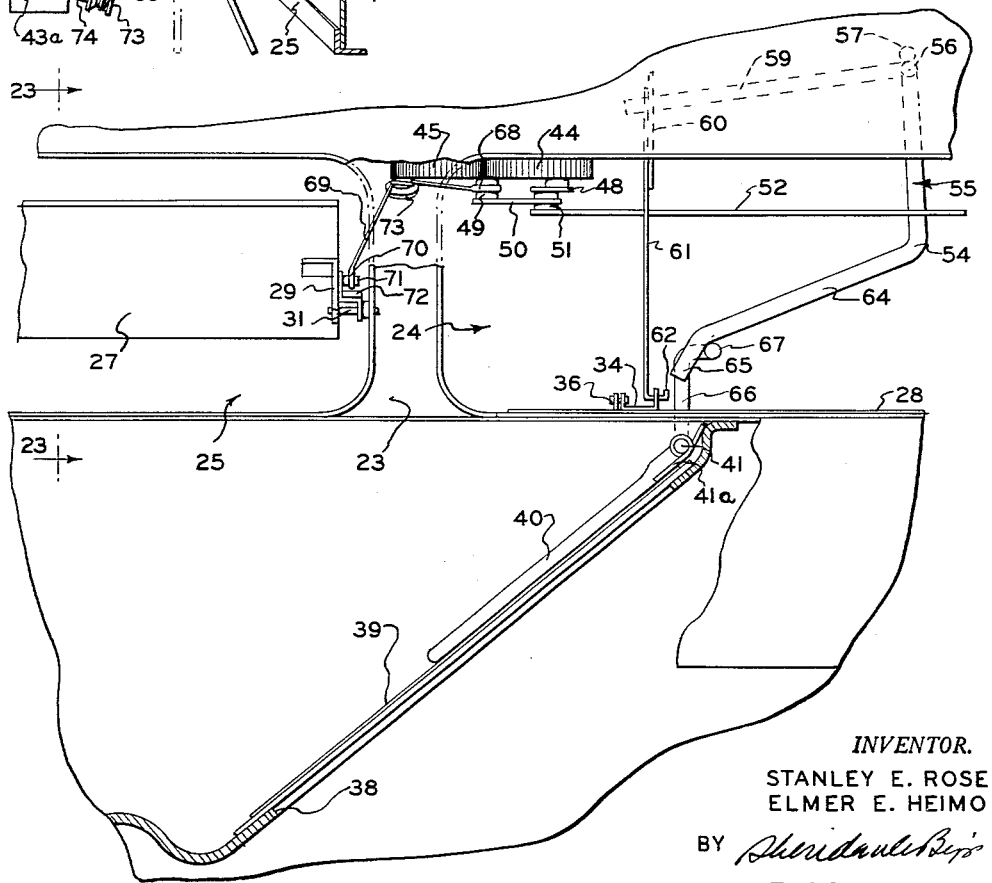
Fig. 22 is a fragmentary view from above showing the position of the air flow dampers of the conditioner during its "dry air" operation.
Figure 25:
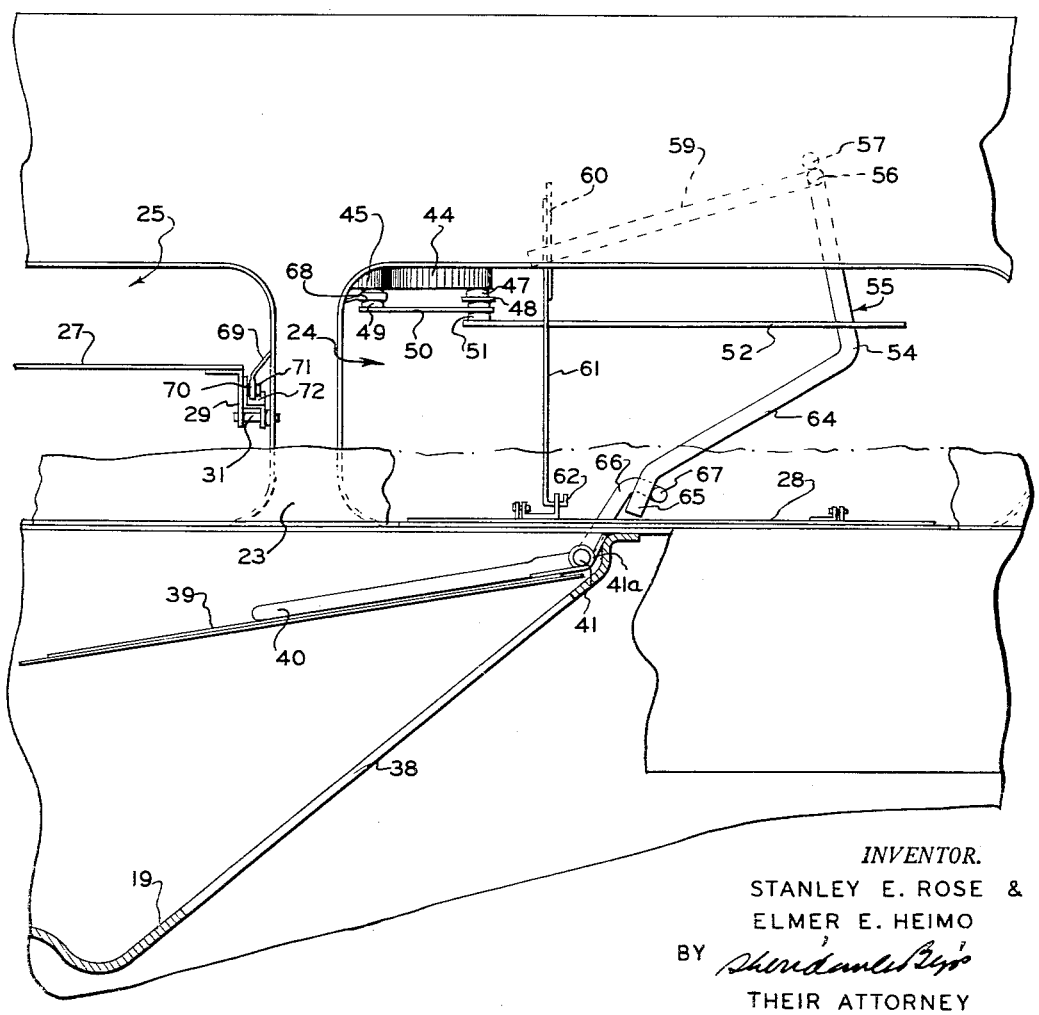
Fig. 25 is a fragmentary view from above showing the position of the air flow dampers of the conditioner during its "exhaust" operation.

However, in addition to this discharge passageway we have also provided in the conditioner 1 means whereby the discharge air from the blower may be exhausted outwardly into the outside atmosphere rather than being discharged into the room through the evaporator. Thus as may be seen in Figs. 3 and 12 there is provided in the wall of scroll 19 leading to outlet 20 an opening or port 38. Normally, this exhaust port 38 is closed by means of a pivoted damper 39 so that the discharge air from the blower flows outwardly through the discharge passageway into the room. However, the damper 39 may be moved to open the port and allow the blower discharge to be exhausted from the room. As is best shown in Figs. 22 and 25, the damper 39 is mounted on a member 40. This mounting member 40 includes a vertically extending stem portion 41 which is pivotally mounted on the baffle 7. Through rotation of the stem 41 the baffle 39 may be moved outwardly from the opening 38 so as to block off the outlet opening 20 of the blower. With the outlet opening 20 so blocked the discharge of the blower flows outwardly through the exhaust port 38 into the outer compartment of the conditioner. The exhaust air is there picked up by the condenser fan 14 and forced outwardly through the condenser 9. A positive pivoting force must be applied though to the stem 41 to move the damper 39 to its open, exhaust air position shown in Fig. 25, since a coil spring 41a is mounted on stem 41 to normally bias the damper in its closed position.

In accordance with our invention all three dampers 27, 29, and 39 are positioned or actuated by a single control knob or shaft. A novel linkage is employed to connect the dampers to the control knob so that it is freely rotatable in either direction from one position to any other position. As shown in Figs. 3 and 11 this master control knob 42 is mounted on a shaft 43 which is journaled in a bracket 43a secured to the frame of the conditioner. The shaft 43 extends inwardly toward the barrier 7 and as shown in Fig. 12 has mounted at its inner end a gear member 44. Meshed with the gear 44 so as to be driven thereby is a second gear 45 which is mounted on a shaft 46. The shaft 46 is journaled in the bracket 43a so as to be rotatable and the gear 45 is firmly affixed thereto so that rotation of the driving gear 44 causes movement of both driven gear 45 and its shaft 46. The purpose of the rotation of shaft 46 will be more fully explained hereinafter.

The dampers are positioned by means of members connected to the two intermeshed gears 44 and 45, these members being shown in detail in Figs. 11 and 12 as well as others. Thus, attached to the gear 44 by a pivot pin 47 is a member or link 48. Similarly attached to the gear 45 by a pivot pin 49 is a member or link 50. Both the links 48 and 50 are attached to their respective gears 44 and 45 adjacent their one ends and adjacent the periphery of the gears. At their other ends the two links are themselves pivoted together by means of a pivot pin 51.

The combination room air, outside air damper 28 and the exhaust damper 39 are both driven by means of the pivot pin 51. For that purpose there is further pivoted to the pin 51 a longitudinal member or link 52. This member 52 extends substantially parallel to the barrier 7 and at its end remote from the pin 51 is provided with a slot 53. Extending through the slot 53 so as to be moved thereby is the actuating arm 54 of a damper control member 55 which is pivotally mounted on the frame of the conditioner. Specifically the member 55 is mounted on the housing by means of an upright portion 56 which is welded or otherwise secured to a shaft 57 that is journaled at its opposite ends in a U-shaped bracket 58 attached to the frame. The connection between the pivoted member 55 and the actuating link 52 is however not such a positive connection that the member 55 will always be pivoted upon the movement of the link 52. Rather as clearly shown in Fig. 11 the slot 53 is considerably longer than the diameter of the actuating portion 54 of member 55. Thus depending upon the position of the link some play may exist between the ends of slot 53 and actuating portion 54. This will allow some movement of the link 52 before arm portion 54 is engaged to cause pivoting of the member 55. In other words the slot 53 and the arm 54 comprise a lost motion connection.

In our preferred linkage the exhaust damper 39 is positioned by means of one portion of the pivoted member 55 and the combination room air, outside air damper 28 is positioned by another portion of the member 55. To position the damper 28 the pivoted member 55 includes an actuated portion 59 which extends outwardly from the stem portion 56 transversely to the actuating portion 54. As is shown clearly in Fig. 16 this portion 59 at its outer end fits through a loop 60 in a damper operating link 61. The length of the loop 60 is considerably greater than the diameter of the portion 59 so that in effect a lost motion connection is provided between the pivoted member 55 and the damper operating link 61. The link 61 is, however, positively connected to the damper 28. It may be attached thereto by any suitable means but is here shown as including a hooked end portion 62 which extends through an aperture in an extension 63 of the damper mounting bracket 34. The link 61 is normally biased inwardly toward barrier 7 to hold damper 28 against the barrier to close port 26. This bias is provided by a spring 63a which includes a body portion coiled around the shaft 57 and an arm portion engaging the link 61.

The engagement between the spring arm and the loop 60 of link 61 is a positive one so that the spring 63a also serves to hold the loop 60 at a predetermined position or location along the actuated portion 59 of member 55. This, of course, determines the length of the lever arm between the upright pivot portion 56 of member 55 and the link 61 and thus determines the mechanical advantage resulting from the movement of member 55. In other words by positively locating the loop 60 on arm 59 the spring 63a determines the force applied to link 61 as a result of the movement of member 55 by its actuating portion 54.

As above mentioned the exhaust damper 39 is also positioned by means of the pivoted member 55. For that purpose the actuating arm 54 of the member 55 includes a transverse portion 64 which terminates in a bent end 65. This bent end 65 directly engages the pivoted member 40 supporting the damper 39. Specifically at the bottom of its stem portion 41 the member 40 includes a horizontal portion 66 which extends through a slot in the baffle 7 and at the end of this horizontal portion there is provided an upstanding extension 67. This extension 67 engages the bent portion 65 of member 55 and may be moved thereby to position damper 39. However, as noted above, the damper 39 is normally biased to the closed position by spring 41a.

Thus it will be seen that dampers 28 and 29 are both connected through the pivoted member 55 and the operating link 52 to the actuating pin 51. The positioning of both is therefore controlled by the movement of pin 51 and the movement of that pin is of course controlled by the rotation of the control shaft 43. The manner in which these dampers 28 and 39 are moved through the movement of the control shaft 43 will be explained hereinafter in greater detail.

In our preferred embodiment the room air control damper 27 is also positioned by means of the same control shaft 43. The manner in which this correlated movement of the damper 27 is effected may be best seen by reference to Figs. 17, 18, and 19. As there shown the damper 27 is positioned by means of the pivot pin 49 attached to the driven gear 45, which also serves to mount the link 50. Between the gear 45 and its outer end at which is mounted the link 50 the pin 49 includes a short shaft portion. Around this shaft portion there is positioned a loop 68 formed at the end of a flexible wire member 69. At its other end the wire 69 has secured thereto a hook or tab 70 which is mounted on a pin 71 attached to a bracket 72. This bracket 72 is pivoted on the same pivot 31 as the mounting bracket 29 of damper 27 and is secured to the bracket 29, so that in effect the wire 69 is at its other end attached to the movable mounting bracket of the damper. Intermediate its ends one or more turns of the wire member 69 are taken around a pulley 73 which is journaled on a stud 74 formed on the mounting bracket 43a. Specifically, the pulley 73 is positioned below and to one side of the gear 45. The part which this pulley 73 plays in the positioning of the damper 28 by the flexible wire member 69 will be more fully explained hereinafter.

In accordance with our invention the control shaft 43 serves not only as the positioning means for the dampers but also serves as a means for controlling the electrical components of the conditioner. In other words, the shaft 43, i. e. the knob 42 mounted thereon, serves as a master control for the operation of the conditioner. It serves both as a switch actuator and a damper operator. The only other control included in our conditioner is the knob 75 (see Figs. 1 and 3) which controls a thermostat for cycling "on" and "off" the compressor, once it has been placed in operation by knob 42. By changing the setting of knob 75, the response of the thermostat 75a, shown in Fig. 26, is varied and thereby the operation of the refrigeration system is adjusted to maintain different average temperatures in evaporator 12 and thus different average temperatures in the air stream discharged into the room. The thermostat though is effective to control the refrigeration system only after the system is placed in operation by means of the master control knob 42.

In our preferred embodiment a single switch 76 is used to control both the electrical motors contained within the conditioner, namely the fan and blower motor 16 and the compressor motor of the condensing unit. As shown in Fig. 26 this single switch 76 is affixed to the opposite side of bracket 43a from the gears 44 and 45, directly in front of the gear 45. The shaft 46 driven by the gear 45 serves as the control shaft for the switch 76 and since gear 45 is turned by the gear 44 mounted on the master control shaft 43, the master control knob 42 thereby controls the switch 76.

As shown in Fig. 4 the shaft 46 has mounted thereon a cam member 77 which serves to control both pairs of contacts 78 and 79 included within the switch. As shown by the full lines in Fig. 4, the cam 77 has a forward cam surface for operating the contacts 79 and as shown by the dotted lines it has a rear cam surface for operating the contacts 78. Contacts 78 control the operation of the fan motor and the contacts 79 control the operation of the compressor motor. These switches are both directly in the lines leading to their respective motors so that when open the motors will be de-energized and when closed the motors will be energized.

There are further included in the switch 76 motion restraining means for releasably retaining the switch control shaft 46 in a plurality of predetermined positions. In other words, the switch 76 includes what is commonly known as a "switch detent" effective to provide a plurality of positive settings of the switch. In the switch 76 this motion restraining means comprises the leaf spring members 80 and 81 and the cooperating hexagonal cam surface 82 provided on the shaft 46. Through the engagement of the six "flats" of this cam surface 82 with the leaf springs, six positions are provided wherein the switch is releasably restrained. In Figs. 5–10 the positions of contacts 78 and 79 in each of these six positions are shown.

In accordance with out invention, this motion restraining or detent means of the switch also serves as a means for providing positive settings of the control knob 42, and in each of these settings correlated predetermined positions of the dampers are effected by the control linkage. Thus in each of these settings the conditioner is adjusted as a whole to provide a different conditioning effect. In other words, since the switch shaft 46 is driven from the control knob 42 through the gears 44 and 45 each time that the switch "detent" holds the switch in a particular position, the control knob 42 will also be held in that position. And our control linkages connecting the dampers to the control shaft 43 are such that in each of these positions of the control knob 42, dampers are placed in different predetermined positions, which positions together with the correlated operation of the blower and compressor motors cause the conditioner to produce a different conditioning effect for each setting of the knob. Since in each of these various operating settings of the control knob it is the switch "detent" or motion restraining means which holds the control knob and the dampers in position as well as the switch itself, this obviates the need for separate detent means which are ordinarily needed to releasably position the control means of air conditioners.

The operation of the conditioner is each of the control knob settings maintained by the switch motion restraining means and the manner in which the control linkage operates to place the dampers in their respective positions will now be explained:

*Operation*

The operation of our new and improved air conditioner may best be understood by reference to the following chart in which are set forth the positions of the various dampers and the conditions of the electrical motors for each operating condition of the conditioner, i. e. for each setting of the control knob:

holds the damper 28 up against barrier 7 so as to completely close the fresh air port 26, and the spring 41a holds shut the damper 39 against the wall of scroll 19 so as to close off the exhaust port 38. Further the position of the pivot pin 49 on the gear 45 is such that no tension is applied to the wire 69. Thereby its turns around pulley 73 are allowed to open up so that no force is applied to the butterfly damper 27 except that of its biasing spring 33. The spring therefore maintains the damper 27 in its full open position.

In our preferred conditioner the knob setting or position immediately adjacent the "off" position is the "cool" position. The motion restraining or "detent" means of the switch 76, of course, releasably retain the knob and its connected linkage in both the positions. In this "cool" setting a maximum flow of room air is circulated through the conditioner to apply the maximum possible cooling to the room. To move the control knob to the "cool" position it is moved clockwise as viewed in Figs. 1 and 3. This, of course, causes a corresponding movement of the gear 44 and thus of the gear 45 and the shaft 46. One result is that the switch is moved to its next position shown in Fig. 6 wherein both contacts 78 and 79 are closed.

| Position | | Elec. Control | | Mechanical Control | | | |
|---|---|---|---|---|---|---|---|
| | | | | Combination Damper | | Exh. Damper, Exh. Port 38 | Butterfly Damper, Room Port 25 |
| No. | Name | Compressor | Blower Motor | Outside Port 26 | Room Port 24 | | |
| 1 | Off | Off | Off | Closed | Open | Closed | Open. |
| 2 | Cool | On | On | do | do | do | Do. |
| 3 | Cool vent | On | On | Partially Open. | Partially Open. | do | Partially Open. |
| 4 | Vent | Off | On | Open | Closed | do | Closed. |
| 5 | Dry Air | On | On | Closed | Open | do | Partially Open. |
| 6 | Exh | Off | On | do | do | Open | Open. |

The purpose of each of the operations of the conditioner determined by the settings of the control knob is as follows:

(1) "Off"—to completely inactivate the conditioner so that no conditioning effect whatsoever is applied to the room.
(2) "Cool"—to condition and recirculate the room air.
(3) "Cool vent"—to allow the entry of fresh outside air, recirculate some room air, and condition and mix the room and fresh air streams before discharge into the room.
(4) "Vent"—to change the air within the room by causing the entry of fresh air thereinto without any conditioning being applied to the fresh air.
(5) "Dry air"—to recirculate a lesser amount of room air cooling the air to a point where a high ratio of dehumidification is obtained without substantial cooling of the room.
(6) "Exhaust"—to remove air from the room thus eliminating smoke, odors or other undesirable elements present in the room air.

Figures 5, 6, 7, 8, 9, 10:
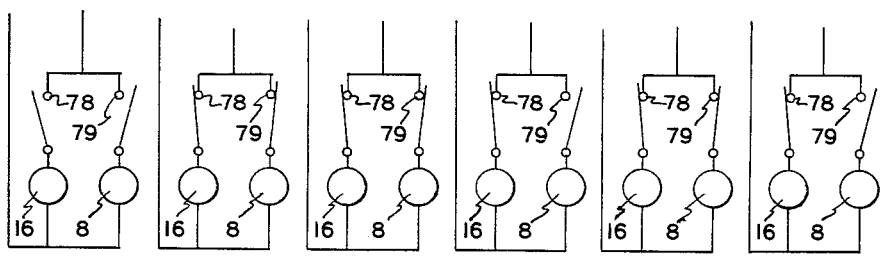
Figs. 5–10 are schematic diagrams showing the switch contacts in their various positions associated with the different operations of the air conditioner.

In Fig. 11 the position of the control linkage in the "off" position of the control knob 42 is illustrated. The corresponding position of the dampers is shown in Fig. 12 and the condition of the electrical contacts is shown in Fig. 5. It should be noted that in this "off" position the links 48 and 50 attached to the inter-meshed gears 44 and 45 form a shallow V causing the pivot pin 51 to take a predetermined position in which the link 52 is held so that movement thereof may occur in either direction before the actuating portion 54 of member 55 will be engaged by the ends of slot 53. The position of member 55 itself is such that it does not apply any force to either damper 28 or damper 39. Rather they both assume their normal positions resulting from the force of their biasing springs. Specifically, the spring 63a This energizes both the fan motor 16 and the compressor motor resulting in the blower means 17 causing a flow of air into the intake passageway and outwardly through the exhaust passageway and in the refrigeration system causing a cooling of the evaporator 12. As shown by a comparison of Figs. 11 and 13 wherein the control shaft 43 appears to have moved counter-clockwise since those views are from the rear, this movement of the control shaft also causes a movement of the links 48 and 50 resulting in a slight downward and to the left movement (as viewed in these figures) of pivot pin 51. However, due to the lost motion connection provided by means of the slot 53 and the arm portion 54 of pivoted member 55, this movement does not cause any movement of the pivoted member 55. Rather only the slack in the lost motion connection is taken up. Thus the exhaust damper 39 and the combination room air, outside air damper 28 remain in their positions shown in Fig. 12. In other words both the exhaust and the outside air ports remain closed. Further, sufficient slack is provided in the wire 69 that the movement of the pivot pin 49 on gear 45 from its position shown in Fig. 11 to that shown in Fig. 12 merely takes up the slack in the wire 69. The movement merely pulls the wire tighter around the pulley 73 and does not cause any turning movement of the room air damper 27. The damper therefore remains full open under the action of its biasing spring 31.

Thus, the end result of the movement of the control knob into the "cool" position is only that the blower and compressor are turned on; all the dampers remain in their original "off" positions. With the dampers so positioned a flow of air is set up by the blower through the room air intake port 25 controlled by damper 27 and also through the room air intake port 24 controlled by the damper 28. Since dampers 27 and 28 both are in positions wherein these ports are both full open, the maximum possible flow of room air is obtained into the blower intake passageway 21. This flow of air is then discharged by the blower outwardly through its discharge opening 20 and flows thence through the exhaust passageway to the evaporator 12. After being cooled by flowing through and around the evaporator 12 the air is then discharged outwardly into the room through the openings 5 in the front of the conditioner to cool the room. Since ports 26 and 38 are closed respectively by dampers 28 and 39, no outside air is brought into the room and no air is exhausted from the room. Rather the full effect of the blower means 17 is utilized to pull room air through the conditioner to cool it. In other words, with the conditioner in this cool position the maximum flow of room air is recirculated and cooled. Of course, the air temperature during this cooling operation of the conditioner may be controlled or adjusted by means of the temperature control knob 75.

In our preferred conditioner the clockwise movement of the control knob 42 into its next setting or position past the "cool" position results in an operation wherein some room air is recirculated through the conditioner and also some air is brought in from without the room. The two air streams are mixed together within the conditioner and cooled before discharge into the room. The position of the various dampers during this "cool vent" conditioning operation may be seen by reference to Figs. 14, 15, and 16, and the condition of the contacts 78 and 79 is shown in Fig. 7. It is, of course, the motion restraining means of the switch which releasably restrain the control knob and the dampers in this "cool vent" setting as in all the other settings thereof. As may be seen by a comparison of Figs. 13 and 14 the movement of the control knob from the cooling position of Fig. 13 to the cooling and ventilating position of Fig. 14 (that movement appearing to be counter-clockwise in these views from the rear) results in the pivot pin 51 and the link 52 being moved still further to the left (as viewed in those Figs.). Since no play remains in the lost motion connection 53—54, the actuating arm 54 of member 55 is pulled to the left by the movement of the link 52. This movement of the actuating arm 54 causes a pivoting of member 55 on shaft 57 and thus movement of the transverse portion 59 of the member. The movement of portion 59 is away from the barrier 7 and since portion 59 is in engagement with the forward end of the loop 60 of operating link 61, the link 61 is also pulled away from baffle 7.

This movement of operating link 61 causes a movement of baffle 28 to the half open position shown in Fig. 16. In other words by pulling the bracket 34 forwardly, the link causes an outward pivoting of the damper 28 on its pivots 36 and 37 to a new position, and in this new position of the damper the opening 26 is uncovered so that some fresh outside air may flow into the unit. However, the damper 28 still restricts flow through the port 26 to some extent. Moreover, in its new position the damper 28 now also restricts to some extent the flow through the room air opening 24. Thus in this position of the control knob the damper 28 is so positioned that it allows some but not full flow through both room air intake port 24 and outside air intake port 26.

The pivoting movement of the member 55 which caused the partial opening of the damper 28 does not, however, cause any movement of the exhaust damper. This pivoting to the left (as viewed in Fig. 15) of member 55 merely carries the extremity 65 of the portion 64 of the member away from the upstanding actuating portion 67 of the damper mounting member 40. In other words the exhaust damper remains in its closed position.

The position of the room air control or butterfly damper 27, however, is different in this cool-vent operation from its position during the straight cooling operation. The operation of the control knob 42 to the "cool vent" position causes the pivot pin 49 to be moved upwardly toward the top of gear 45. This movement pulls wire 69 sufficiently to cause movement of the damper 27. As shown in Fig. 15 the bracket 72 is pulled downwardly by the wire 69 and thereby the entire damper is pivoted from its previous vertical position to a more or less slanted position and in this slanted position the damper 27 partially closes off the room air intake port 25. The position of the damper 27 at this point is the same as that shown by the full lines in Fig. 23.

Thus through the movement of the control knob into the cool vent position both room air openings are partially closed off and the outside air opening as partially opened up. Thus the blower 17 being energized through contacts 78 now pulls into its intake passageway both room air and outside air with flow of both being somewhat restricted to cause the proper amounts of each to be circulated. The room air and outside air are mixed in passageway 21 and in the blower itself and are then discharged through the exhaust passageway and evaporator 12 into the room. The outside air reaches the port 26, of course, by entering the slots 6 in the sides of the housing of the outer compartment and then flowing through the outer compartment to the port. This admission of some outside air to the airstream passing through the evaporator and into the room helps to eliminate stuffiness within the room. The flow of outside air admitted to the conditioner is, however, small enough during this operation that it may be cooled sufficiently to maintain the room at the desired temperature. The contacts 79 are closed during this operation of the conditioner so that the same cooling effect is applied to the air stream flowing through the conditioner as in the cooling cycle. The admission of the warm outside air into the air stream, of course, increases the amount of heat which must be extracted by the evaporator for the dicharge air of the conditioner to be maintained at the same temperature.

A further movement of the control knob 42 in the clockwise direction as viewed in Figs. 1 and 3 from its "cool-vent" position places the conditioner in its venting operation, the motion restraining or "detent" means of switch 76 releasably retaining the knob in the position as in the others. This venting operation is designed to bring a large supply of fresh air into the room without cooling. In other words, it is designed to provide a quick ventilation of the room. The position of the dampers and the control in this "vent" position of the knob may be seen in Figs. 17–20 and the positions of the switch contacts are shown in Fig. 8. By comparing Fig. 14 with Fig. 17 it will be seen that through the movement of the control knob to the "vent" position, the arms 48 and 50 are actuated to move the pivot 51 still further to the left (as viewed in those Figs.). This causes a further movement to the left of the link 52 and thus a similar movement of the arm portion 54 of member 55. As a result the member 55 is pivoted causing a still further outward movement of its transverse portion 59 away from the baffle 7. This outward movement of portion 59 pulls the damper operating link 61 forward and moves the combination room air, outside air damper 28 to its maximum outward position. As may be seen in Fig. 20 the damper 28 in this maximum outward position offers substantially no restriction whatsoever to flow through outside air intake port 26, but it almost completely blocks off the room air intake port 24. In other words the outside air intake port 26 is now full open and the room air intake port 24 almost completely closed. However, since the movement of the inner portion 64 of member 55 is in the same direction as before, it merely moves further away from the upstanding extension 67 of the exhaust damper control member 40 and thereby the exhaust damper remains closed.

The movement of the pin 49 on gear 45 is still further upward from its position in the "cool-vent" operation. This increases the distance between the pin 49 and the pulley 73 and thus causes an additional movement of the flexible wire 69. As shown in Fig. 19 this movement of the wire pulls the bracket 72 downwardly and causes the damper 27 to almost completely close the room air intake port 25. Thus both room air intake ports are closed and the full force of the blower is therefore available to pull fresh air in through the outside air intake port 26 and discharge it outwardly through the exhaust passageway into the room. As before, the fresh air reaches port 26 by entering the slots 6 in the compartment housing and flowing through the outer compartment to the port.

As may be seen in Fig. 8 the contacts 78 are closed during this operation so that the blower is operating. The compressor control contacts 79 however are open so that the compressor is idle. Since this operation is designed primarily to bring outside air into the room without cooling, there is no need for the compressor and thereby the refrigeration system to be operating. The conditioner thus operates in this setting of the control knob to discharge a large volume of fresh air into the room thereby to quickly ventilate the room.

The fifth position wherein our control may be held by the restraining means of switch 76 adjusts the conditioner for an operation which we have termed "dry air." A continued clockwise movement of the knob 42 (as viewed in Figs. 1 and 3) from the vent position places the knob in the "dry air" position. This "dry air" operation is designed to dehumidify the air within the room without causing any substantial cooling of the room. As indicated in Fig. 9 the contacts 78 and 79 are both closed during the operation so that both the blower and the compressor are running. The positions of the control knob and the various dampers are shown in Figs. 21–23.

Figure 21:
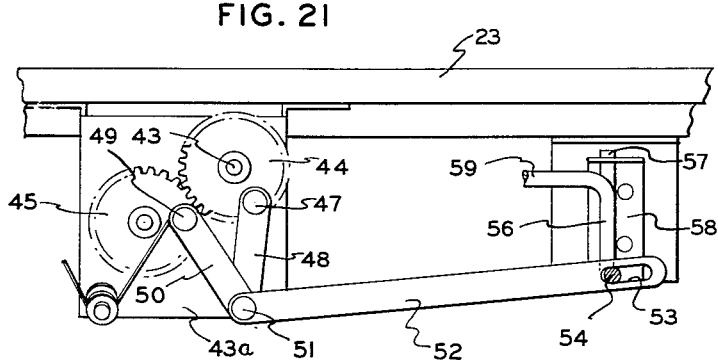
Fig. 21 is a fragmentary view from the rear showing the air conditioner control means in its "dry air" setting.

The movement of the master control knob into the "dry air" setting causes the links 48 and 50 to move the pivot pin 51 considerably to the right as viewed in Fig. 21. This movement of the pivot pin 51 to the right also moves the link 52 to the right and thus through the connection 53—54 causes the member 55 to pivot to its normal position, i. e. a position substantially the same as that of its "off" position. Since the transverse portion 59 of member 55 is no longer forcing the damper operating member 61 outwardly, the spring 63a forces the link 61 inwardly and moves the damper 28 against the baffle 7. This completely closes the outside air inlet port 26 and opens the inside air intake port 24.

The movement of the control knob also results in the pin 49 mounted on gear 44 moving somewhat downwardly and to the right (as viewed in Fig. 21) so that less tension is applied to the wire member 69. This allows the spring 33 to return the damper 27 to its position wherein it only partially closes the room air intake port 25. In other words, the position of the pivot pin 49 is now such that the wire 69 holds the damper 27 in a position wherein some air will be admitted through the intake port 25 but still full flow therethrough is not permitted. The exhaust damper remains closed since no movement to the right (as viewed in Fig. 22) of member 55 has occurred from its normal position.

Thus with the dampers in this position room air may be pulled into the blower intake passageway 21 through the air intake ports 24 and 25 and discharged outwardly through the exhaust passageway and the evaporator. No outside air can be brought into the passageway. However, since the intake port 25 closest to the blower intake 18 itself is partially closed, the flow of room air produced by the blower is not as great as during the cooling operation. In fact the flow is substantially less than that of the cooling position in order to prevent any appreciable cooling of the room. However, what air does flow through the conditioner is cooled to a more considerable extent than during the cooling operation. This results in a very large amount of the moisture contained in this air being condensed therefrom onto the cold evaporator. In other words, a dehumidification of the air passing through the cooler occurs. By continuing this operation over a period of time the humidity in the room may be substantially reduced without causing appreciable cooling.

The final setting in which the switch motion restraining or "detent" means are effective to maintain the control knob and its connected linkage lies between the aforesaid "dry air" position and the "off" position. In this position the unit is adjusted to operate as an exhausting means. In other words, it is adjusted to remove air from the room to eliminate smoke, odor, or any other undesirable air condition existing within the room. As shown in Fig. 10 the contacts 78 are closed to energize the blower and fan motor 16 during this operation, but the contacts 79 are opened to de-energize compressor 8. The position of the control means and the dampers may be seen by reference to Figs. 24 and 25.

Figure 24:
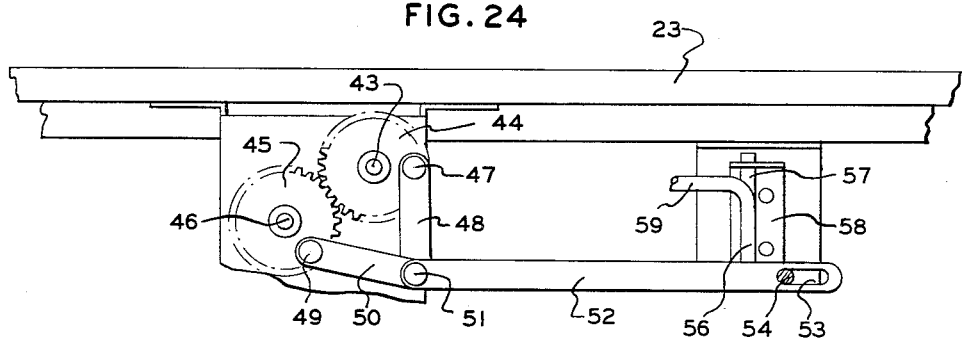
Fig. 24 is a fragmentary view from the rear showing the air conditioner control means in its "exhaust" setting.

As shown in Fig. 24 the movement of the control knob 42 to this exhaust position results in the links 48 and 50 moving the pivot pin 51 to the right (as viewed in Fig. 24) of its normal position. This movement to the right of the pivot pin causes a movement of the link 52 to the right and as a result the connection 53—54 effects a pivoting of the member 55. The movement of the member 55 is in the opposite direction to its movement in the other operating positions of the conditioner. In other words the one transverse portion 59 of member 55 is moved inwardly whereas the other transverse portion 64 is moved to the right (as viewed in Fig. 25). Due to the play or lost motion allowable by the loop 60 of link 61 this movement of the member 55 does not have any effect on the damper 28. It remains tight against barrier 7 closing outside air intake port 26 and allowing free flow of air through room air intake port 24. The movement of the arm 64, however, results in the upstanding portion 67 of damper control member 40 being pushed to the right and toward the barrier 7. This causes the member 40 to pivot around its stem 41 and open the exhaust damper 39. Moreover, the butterfly damper 27 controlling the room intake air port 25 returns to its fully open position as a result of the control knob 42 being moved into this exhaust position. The pin 49 on gear 45 is moved downwardly far enough to allow sufficient slack in the wire member 69 that the spring 33 may bias the damper 27 to its fully open upright position.

Thus in this exhaust position both room air intake ports 24 and 25 are full open, the exhaust port 38 is open and the outside air intake port 26 is completely closed. As a result the blower 17 sucks in the largest amount possible of room air through the ports 24 and 25 and its intake passageway 21 and discharges this air outwardly through the exhaust port 38. The exhaust damper 39 by swinging outwardly substantially blocks off the discharge opening 20 of the blower so that the air must flow outwardly into the outer compartment of the conditioner rather than into the room. The air is picked up in the outer compartment by the condenser fan 14 and forced outwardly through the condenser into the atmosphere. Thus in this operation nearly the full force of both the blower and the condenser fan are placed in series to remove air from the room.

A further movement of the control knob in the same clockwise direction (as viewed in Figs. 1 and 3) will return the knob and the various components of the conditioner to the "off" position first described above. It should be understood, however, that the master control shaft 43 and its connected linkage are so constructed that the master control knob 42 may be moved in any direction from any of these positions to the other position. For any knob setting links 48 and 50 pivoted to the gears 44 and 45 will occupy the same positions no matter in which direction the control shaft is turned to reach that setting. This, of course, means that the pin 51 and the link 52 will also take the same positions for any knob setting no matter in which direction the knob is rotated; and therefore the dampers 28 and 39 will always be positioned the same by the member 55 controlled by link 52. Further, due to the manner in which wire 69 is loosely wrapped around the pulley 73 and is connected by loose loops to the gear pin 49 and the damper bracket 72, it too will not cause any hindrance to movement of the gears in either direction. It will be pulled the same amount in any setting no matter in which direction the knob is turned to reach the setting, and therefore will position damper 27 independently of the direction of rotation of the control knob. Thus a considerable improvement is obtained over air conditioner controls which are only movable in one direction or must always be returned to the "off" position before being moved to another position. The motion restraining means of the switch is, of course, effective to maintain the control knob and thereby the control linkage and the dampers in each of the predetermined settings or positions thereof. This, of course, obviates the need for separate detent or motion restraining means heretofore associated with such controls.

Thus, it may be seen that through our invention we have provided a new and improved air conditioner which may be simply and easily adjusted by means of a single master control to provide any of a plurality of different conditioning effects within a room. Our improved air flow means permits the conditioner to be adjusted positively to provide the desired conditioning effect. The various air flow passageways and dampers of our conditioner permit not only a predetermined control of the outside air flow and the exhaust air flow but also permit a control of the room air flow itself.

While, in accordance with the Patent Statutes, we have described what at present is considered to be the preferred embodiment of our invention, it will be obvious to those skilled in the art that various changes and modifications may be made therein without departing from the invention and it is, therefore, aimed in the appended claims to cover all such changes and modifications as fall within the true spirit and scope of our invention.

What we claim as new and desire to secure by Letters Patent of the United States is:

1. A self-contained unit for conditioning a room comprising a housing, a barrier dividing said housing into an outer compartment and an inner compartment, a condensing unit mounted in said outer compartment, an evaporator mounted in said inner compartment, blower means for blowing a stream of air across said evaporator and into said room, means defining an intake passageway in said inner compartment leading to the intake of said blower means, a pair of room air intake ports leading from said room into said passageway, an outside air intake port for bringing outside air into said room comprising an aperture in said barrier opening into said passageway, a first damper for controlling the flow through one of said room air intake ports, a second damper for controlling the flow of air through the other of said room air intake ports and said outside air intake port, and manually operated means for simultaneously positioning said dampers to vary the intake flow through said ports to said blower means thereby to apply different conditioning effects to said room.

2. A self contained unit for conditioning a room comprising a housing, a barrier dividing said housing into an outer compartment and an inner compartment, a condensing unit mounted in said outer compartment, an evaporator mounted in said inner compartment, blower means for blowing a stream of air across said evaporator and into said room, means defining an intake passageway in said inner compartment leading to the intake of said blower means, a pair of room air intake ports opening from said room into said passageway, with one of said room air intake ports being closely adjacent said intake of said blower, an outside air intake port for bringing outside air into said room comprising an aperture in said barrier opening into said passageway, a first damper for controlling the flow through said one room air intake port, a second damper for controlling the flow through said outside air intake port and the other of said room air intake ports, and means for simultaneously positioning said dampers thereby to vary the intake flow through said ports to said blower means to apply different conditioning effects to said room.

3. A self-contained unit for conditioning a room comprising a housing, a barrier dividing said housing into an outer compartment and an inner compartment, said housing having a plurality of slots connecting said outer compartment to the outside atmosphere, a condensing unit mounted in said outer compartment, blower means for blowing a stream of air across said evaporator and into said room, means defining an intake passageway in said inner compartment leading to the intake of said blower means, a pair of room air intake ports opening from said room into said passageway, with one of said room air intake ports being closely adjacent said intake of said blower means, an outside air intake port for bringing outside air into said room comprising an aperture in said barrier opening from said outer compartment into said passageway, a butterfly damper for controlling the flow through said one room air intake port, a second damper for controlling the flow through said outside air intake port and the other of said room air intake ports, and means for simultaneously positioning said dampers to vary the intake flow through said ports to said blower means thereby to apply different conditioning effects to said room.

4. A self-contained unit for conditioning a room comprising a housing, a barrier dividing said housing into inner and outer compartments, said housing containing a plurality of openings connecting said outer compartment to the outside atmosphere, a condensing unit mounted in said outer compartment, an evaporator mounted in said inner compartment, blower means mounted in communication with said inner compartment, means defining an intake passageway in said inner compartment leading to the intake of said blower means, means defining an exhaust passageway leading from the exhaust of said blower means through said evaporator to said room, an outside air intake port for bringing outside air into said room comprising a first aperture in said barrier opening from said outer compartment into said intake passageway, an exhaust port for exhausting air from said room comprising a second aperture in said barrier opening from said exhaust passageway into said outer compartment, a pair of room air intake ports from said room opening into said intake passageway, a first damper for controlling air flow through said outside air intake port and one of said room air intake ports, a second damper for controlling air flow through said exhaust port, a third damper for controlling air flow through the other of said room air intake ports, and manually operated means for simultaneously positioning said dampers to control the intake air flow to said blower means and the exhaust air flow from said blower means thereby to vary the conditioning effect applied to said room through the operation of said unit.

5. A self-contained unit for conditioning a room comprising a housing, a barrier dividing said housing into inner and outer compartments, said housing containing a plurality of openings connecting said outer compartment to the outside atmosphere, a condensing unit mounted in said outer compartment, an evaporator mounted in said inner compartment, blower means mounted in said inner compartment, means defining an intake passageway in said inner compartment leading to the intake of said blower means, means defining an exhaust passageway leading from the exhaust of said blower means through said evaporator to said room, an outside air intake port for bringing outside air into said room comprising a first aperture in said barrier opening from said outer compartment into said intake passageway, an exhaust port for exhausting air from said room comprising a second aperture in said barrier opening from said exhaust passageway into said outer compartment, a pair of room intake ports opening from said room into said intake passageway, a first damper for controlling air flow through said outside air intake port and one of said room air intake ports, a second damper for controlling air flow through said exhaust port, said second damper adapted when open to cause the exhaust air of said blower to pass through said exhaust port and when closed to cause said exhaust air flow of said blower means to pass through said exhaust passageway and said evaporator into said room, a butterfly damper for controlling air flow through the other of said room air intake ports, and manually operated means for simultaneously positioning said dampers to control the intake air flow to said blower means and the exhaust air flow from said blower means thereby to vary the conditioning effect applied to said room through the operation of said unit.

6. A self-contained unit for conditioning a room comprising a condensing unit, an evaporator, a blower, means defining a passageway leading from the outlet of said blower through said evaporator to said room for introducing conditioned air into said room, room air inlet means for admitting room air to the intake of said blower, a control for said room air inlet means, an outside air inlet means for admitting air from without said room to said intake of said blower, a control for said outside air inlet means, a switch having a pair of contacts for controlling said blower means, a pair of contacts for controlling said condensing unit and a single control means for operating both of said pair of said contacts, said control means being operable to a plurality of positions and including motion restraining means effective to releasably retain said control means in each of said positions, said control means being adapted to operate said contacts in a predetermined manner in each of said positions, and a manually operated master control member operatively connected to the air inlet controls and the switch control means to simultaneously operate said controls and said switch, said master control member being releasably retained in a plurality of positions by said motion restraining means of said switch and operating said air inlet controls to predetermined positions in each of its said positions, whereby said unit may be manually adjusted by said master control member to apply a plurality of predetermined conditioning effects to said room with each position of said master control member determined by said motion-restraining means of said switch causing a different conditioning effect.

7. A self-controlled unit for conditioning a room comprising a condensing unit, an evaporator, a blower, means defining a passageway leading from the outlet of said blower through said evaporator to said room for introducing conditioned air into said room, room air inlet means for admitting room air to the intake of said blower, a control for said room air inlet means, an outside air inlet means for admitting air from without said room to said intake of said blower, a control for said outside air inlet means, an exhaust means for exhausting air from the outlet of said blower to without said room, a control for said exhaust means, a switch having a pair of contacts for controlling said blower means, a pair of contacts for controlling said condensing unit and a single control means for operating both of said pairs of contacts, said control means being operable to a plurality of positions and including motion restraining means effective to releasably restrain said control means in each of said positions, said control means being adapted to operate said contacts in a predetermined manner in each of said positions, and a manually operated master control member operatively connected to the air inlet controls, the exhaust control and the switch control means to simultaneously operate said controls and said switch, said master control being releasably retained in a plurality of positions by said motion restraining means of said switch and operating said air inlet controls and the exhaust control to predetermined positions in each of its said positions, whereby said unit may be manually adjusted by said master control member to apply a plurality of predetermined conditioning effects to said room with each position of said master control determined by said motion restraining means of said switch causing a different conditioning effect.

8. In a self-contained unit for conditioning a room, a condensing unit, an evaporator, a blower means for creating a flow of air to condition said room, a plurality of dampers for controlling the intake and exhaust air streams of said blower means, a switch having a pair of contacts for controlling said blower means, a pair of contacts for controlling said condensing unit and a single control means for operating both of said pairs of contacts, said control means being operable to a plurality of positions and including motion restraining means effective to releasably retain said control means in each of said positions, said control means being adapted to operate said contacts in a predetermined manner in each of said positions, and a master control member operably connected to said dampers and said switch control means to operate said dampers and said contacts, the connection between said switch control means and said master control member including positively engaged members causing said master control member to be releasably retained by said motion restraining means of said switch in a plurality of positions corresponding to said positions of said switch control means, and the connection between said dampers and said master control member effecting a predetermined positioning of said dampers in each of said positions of said control member, whereby movement of said master control into each of its said positions determined by the motion restraining means of said switch results in a correlated operation of said switch and said dampers to cause a different conditioning effect to be applied to said room.

9. In a self-contained unit for conditioning a room, a condensing unit, an evaporator, a blower means for creating a flow of air to condition said room, a plurality of dampers for controlling the intake to said blower means, a switch having a pair of contacts for controlling said blower means, a pair of contacts for controlling said condensing unit, and a single control means for operating both of said pairs of contacts, said control means being operable to a plurality of positions and including motion restraining means effective to releasably retain said control means in each of said positions, said control means being adapted to operate said contacts in a predetermined manner in each of said positions, and a master control member operatively connected to said dampers and said switch control means to operate said dampers and said contacts, the connection between said switch control means and said master control member including positively engaged members causing said master control member to be releasably retained by said motion restraining means of said switch in a plurality of positions corresponding to the positions of said switch control means, and the connection between said dampers and said master control member effecting a predetermined positioning of said dampers in each of said positions of said master control member, whereby movement of said master control member into each of its said positions determined by the motion restraining means of said switch results in a correlated operation of said switch and said dampers to cause a different conditioning effect to be applied to said room.

10. In a self-contained unit for conditioning a room, a condensing unit, an evaporator, a blower means for creating a flow of air to condition said room, a plurality of dampers for controlling the intake air to said blower means, a switch having a pair of contacts for controlling said blower means, a pair of contacts for controlling said condensing unit and a single rotatable control shaft for operating both of said pairs of contacts, said control shaft being rotatable to a plurality of positions and adapted to operate said contacts in a predetermined manner in each of said positions, said switch having motion restraining means effective to releasably retain said control shaft in each of said positions, and a rotatable master control knob connected to said dampers and said switch control shaft to operate said dampers and said switch, the connection between said control knob and said switch control shaft including a plurality of intermeshed gears causing said master control member to be releasably retained by said motion restraining means of said switch in a plurality of positions corresponding to the positions of said switch control shaft, and the connection between said dampers and said master control knob including a plurality of links effecting a predetermined positioning of said dampers in each of said positions of said master control knob, whereby rotation of said master control knob into each of its said positions determined by the motion restraining means of said switch results in a correlated operation of said switch and said dampers to cause a different conditioning effect to be applied to said room.

11. A self-contained unit for conditioning a room comprising a housing, a barrier dividing said housing into an outer compartment and an inner compartment, a condensing unit mounted in said outer compartment, an evaporator mounted in said inner compartment, blower means for blowing a stream of air across said evaporator and into said room, means defining an intake passageway in said inner compartment leading to the intake of said blower means, a pair of room air intake ports opening from said room into said passageway, an outside air intake port for bringing outside air into said room comprising an aperture in said barrier opening into said passageway, a first damper for controlling the flow through one of said room air intake ports, a second damper for controlling the flow through the other of said room air intake ports and said outside air intake ports, a switch having a pair of contacts for controlling said blower means, a pair of contacts for controlling said condensing unit and a single control means for operating both of said pairs of said contacts, said control means being operable to a plurality of positions and including motion restraining means effective to releasably retain said control means in each of said positions, said control means being adapted to operate said contacts in a predetermined manner in each of said positions, and a master control member operatively connected to said dampers and said switch control means to operate said dampers and said switch, the connection between said switch control means and said master control member including a plurality of inter-meshed gears causing said master control member to be releasably retained by said motion restraining means of said switch in a plurality of positions corresponding to the positions of said switch control means, and the connection between said dampers and said master control member including a linkage for effecting a predetermined positioning of said dampers in each of said positions of said master control member, whereby movement of said master control member into each of its said positions determined by the motion restraining means of said switch results in a correlated operation of said switch and said dampers to cause a different conditioning effect to be applied to said room.

12. A self-contained unit for conditioning a room comprising a housing, a barrier dividing said housing into inner and outer compartments, a condensing unit mounted in said outer compartment, an evaporator mounted in said inner compartment, blower means mounted in said inner compartment, means defining an intake passageway in said inner compartment leading to the intake of said blower means, means defining an exhaust passageway leading from the exhaust of said blower through said evaporator to said room, an outside air intake port for bringing air from without said room into said room comprising a first aperture in said barrier opening into said intake passageway, an exhaust port for exhausting air from said room comprising a second aperture in said barrier opening from said exhaust passageway into said outer compartment, a pair of room air intake ports opening into said intake passageway, a first damper for controlling air flow through said outside air intake port and one of said room air intake ports, a second damper for controlling air through said exhaust port, a third damper for controlling air flow through the other of said room air intake ports, a switch having a pair of contacts for controlling said blower means, a pair of contacts for controlling said condensing unit and a single control means for operating both of said pairs of contacts, said control means being operable to a plurality of positions and including motion restraining means effectively to releasably retain said control in each of said positions, said control means being adapted to operate said contacts in a predetermined manner in each of said positions, and a master control member operatively connected to said dampers and said switch control means to operate said dampers and said contacts, the connection between said switch control means and said master control member including a plurality of inter-meshed gears causing said master control member to be releasably retained by said motion restraining means of said switch in a plurality of positions corresponding to the positions of said switch control means, and the connection between said dampers and said master control comprising a linkage for effecting a predetermined positioning of said dampers in each of said positions of said master control member, whereby movement of said master control member into each of said positions determined by the motion restraining means of said switch results in a correlated operation of said switch and said dampers to cause a different conditioning effect to be applied to said room.

13. A self-contained unit for conditioning a room comprising a housing, a barrier dividing said housing into an outer compartment and an inner compartment, a condensing unit positioned in said outer compartment, an evaporator positioned in said inner compartment, blower means for blowing a stream of air across said evaporator and into said room, means defining an intake passageway in said inner compartment leading to the intake of said blower means, a pair of room air intake ports opening from said room into said passageway, an outside air intake port for admitting outside air into said room comprising an aperture in said barrier opening in said passageway, a first damper for controlling a flow through one of said room air intake ports, a second damper for controlling the flow of air through the other of said intake ports and said outside air intake port, a switch having a pair of contacts for controlling said blower means, a pair of contacts for controlling said condensing unit and a single control shaft for operating both pairs of contacts, and a single rotatable control knob operatively connected to said dampers and to said switch control shaft for simultaneously operating said dampers and said switch thereby to vary the conditioning effect applied to the room by said unit.

14. A self-contained unit for conditioning a room comprising a housing, a barrier dividing said housing into inner and outer compartments, a condensing unit mounted in said outer compartment, an evaporator mounted in said inner compartment, blower means mounted in communication with said inner compartment, means defining an intake passageway in said inner compartment leading to the intake of said blower means, means defining an exhaust passageway leading from the exhaust of said blower means through said evaporator to said room, an outside air intake port for bringing outside air into said room comprising a first aperture in said barrier opening into said intake passageway, an exhaust port for exhausting air from said room comprising a second aperture in said barrier opening from said exhaust passageway into said outer compartment, a pair of room air intake ports opening into said intake passageway, a first damper for controlling the air flow through said outside air intake port and one of said room air intake ports, a second damper for controlling air flow through said exhaust port, a third damper for controlling air flow through the other of said room air intake ports, a switch having a pair of contacts for controlling said blower means, a pair of contacts for controlling said condensing unit and a single control shaft for operating both pairs of contacts, and a master rotatable control knob operatively connected to said dampers and said switch control shaft for simultaneously positioning said dampers and turning said switch control shaft, whereby the conditioning effect applied to said room by said unit may be varied through the operation of said master control knob alone.

15. In an air conditioning unit having electrically driven blower and compressor means, a plurality of dampers for controlling air flow, and a switch for controlling said electrically driven means; means for simultaneously operating said dampers and said switch comprising a rotatable master control member, a rotatable shaft for operating said switch, a first gear mounted on said control member, a second gear mounted on said rotatable shaft and meshing with said first gear to turn said shaft upon the rotation of said control member, a pair of links pivoted together at their one ends and pivoted to separate ones of said gears at their other ends, means for operating one of said dampers connected to said second gear at the point of attachment of the link pivoted thereto, and means for operating the remainder of said dampers connected to the pivoted together ends of said links, whereby upon the rotation of said master control member in either direction said dampers and said switch are simultaneously operated by the rotation of said gears.

16. In an air conditioning unit having electrically driven blower and compressor means, a plurality of dampers for controlling air flow, and a switch for controlling said electrically driven means; means for simultaneously operating said dampers and said switch comprising a rotatable master control member, a rotatable shaft for operating said switch, a first gear mounted on said control member, a second gear mounted on said rotatable shaft and meshing with said first gear to turn said shaft upon the rotation of said control member, a pair of links pivoted together at their one ends and pivoted to separate ones of said gears at their other ends, a flexible wire member for operating one of said dampers connected to said second gear, and means including a member attached to said links at their pivoted together ends for operating the remainder of said dampers, whereby upon the rotation of said master control member in either direction said dampers and said switch are simultaneously operated by the rotation of said gears.

17. In an air conditioning unit having a housing, an electrically driven blower and compressor means, a plurality of dampers mounted within said housing for controlling air flow, and a switch for controlling said electrically driven means; means for simultaneously operating said dampers and said switch comprising a rotatable master control member, a rotatable shaft for operating said switch, a first gear mounted on said first control member, a second gear mounted on said rotatable shaft and meshing with said first gear to turn said shaft upon the rotation of said control member, a pair of links pivoted together at their one ends and pivoted to separate ones of said gears at their other ends, means for operating one of said dampers connected to said second gear, a third link pivoted to said pair of links at their pivoted together ends, and means driven by said third link for operating the remainder of said dampers, said means including a member pivoted to said housing and a lost motion connection joining said member and said third link whereby upon the rotation of said master control member in either direction said dampers and said switch are simultaneously operated by the rotation of said gears.

18. In an air conditioning unit having electrically driven blower and compressor means, a plurality of dampers for controlling air flow, and a switch for controlling said electrically driven means; means for simultaneously operating said dampers and said switch comprising a rotatable master control member, a rotatable shaft for operating said switch, a first gear mounted on said control member, a second gear mounted on said rotatable shaft and meshing with said first gear to turn said shaft upon the rotation of said control member, a pair of links pivoted together at their one ends and pivoted to separate ones of said gears at their other ends, a third link pivoted to said first and second links at their said one ends, a means driven by said third link for operating said dampers, said means including a member pivoted to said housing and a lost motion connection joining said member and said link, whereby upon the rotation of said master control member in either direction said dampers and said switch are simultaneously operated by the rotation of said gears.

19. In an air conditioning unit having electrically driven blower and compressor means, a plurality of dampers for controlling air flow and a switch for controlling said electrically driven means, means for operating said dampers and said switch comprising a rotatable master control member, a rotatable shaft for operating said switch, a first gear mounted on said control member, a second gear mounted on said rotatable shaft and meshing with said first gear to turn said shaft upon the rotation of said control member, a pair of links pivoted together at their one ends and pivoted to separate ones of said gears at their other ends, and means including a member attached to said links at their said one ends for operating said dampers whereby upon the rotation of said control member in either direction said dampers and said switch are simultaneously operated by the rotation of said gears.

20. In an air conditioning unit having electrically driven blower and compressor means, a plurality of dampers for controlling air flow and a switch for controlling said electrically driven means, means for simultaneously operating said dampers and said switch comprising a rotatable master control member, a rotatable shaft for operating said switch, a first gear mounted on said control member, a second gear mounted on said rotatable shaft and meshing with said first gear to turn said shaft upon the rotation of said control member, a pair of links pivoted together at their one ends and pivoted to separate ones of said gears at their other ends, means including a member attached to said links at their said one ends for operating said dampers, whereby said dampers and said switch are simultaneously operated by said gears upon rotation of said control member in either direction, and motion restraining means cooperating with said rotatable shaft for releasably retaining said shaft and thereby said control member and said dampers in a plurality of predetermined positions, whereby said unit may be selectively adjusted by said control member for a plurality of positive predetermined conditioning operations.

21. In an air conditioning unit having electrically driven blower and compressor means, a plurality of dampers for controlling air flow and a switch for controlling said electrically driven means; means for simultaneously operating said dampers and said switch comprising a rotatable master control member, a rotatable shaft for operating said switch, a first gear mounted on said control member, a second gear mounted on said rotatable shaft and meshing with said first gear to turn said shaft upon the rotation of said control member, a pair of links pivoted together at their one ends and pivoted to separate ones of said gears at their other ends, a third link pivoted to said first and second links at their said one ends, means driven by said link for operating said dampers, said means including a member pivoted to said housing and a lost motion connection joining said member and said link, whereby said dampers and said switch are simultaneously operated by said gears upon rotation of said master control member in either direction, and motion restraining means cooperating with said rotatable shaft for releasably retaining said shaft and thereby said control member and said dampers in a plurality of predetermined positions, whereby said unit may be selectively adjusted by said control member for a plurality of positive predetermined conditioning operations.

22. In an air conditioning unit having a housing, an electrically driven blower and compressor means, a plurality of dampers mounted within said housing for controlling air flow, and a switch for controlling said electrically driven means; means for simultaneously operating said dampers and said switch comprising a rotatable master control member, a rotatable shaft for operating said switch, a first gear mounted on said first control member, a second gear mounted on said rotatable shaft and meshing with said first gear to turn said shaft upon the rotation of said control member, a pair of links pivoted together at their one ends and pivoted to separate ones of said gears at their outer ends, means for operating one of said dampers connected to said second gear, a third link pivoted to said pair of links at their pivoted together ends, and means driven by said third link for operating the remainder of said dampers, said means including a member pivoted to said housing and a lost motion connection joining said member and said third link, whereby said dampers and said switch are simultaneously operated by the rotation of said gears upon rotation of said master control member in either direction, and means cooperating with said rotatable shaft for releasably retaining said shaft and thereby said control member and said dampers in a plurality of predetermined positions, whereby said unit may be selectively adjusted by said control member for a plurality of positive predetermined conditioning operations.

23. In a self-contained unit for conditioning a room, a condensing unit, an evaporator, a blower means for creating a flow of air to condition said room, damper means for controlling the flow through said blower means, a switch having contacts for controlling said blower means and said condensing unit and a switch control member for operating said contacts, said control member being operable to a plurality of positions and including motion restraining means effective to releasably retain said control member in each of said positions, said control member being adapted to operate said contacts in a predetermined manner in each of said positions, a second control member operatively connected to said switch control member, the connection between said control members including positively engaged members causing said second control member to be releasably retained by said motion restraining means of said switch in a plurality of positions corresponding to the positions of said switch control member, one of said control members comprising a master control operatively connected to said damper means for operating said damper means simultaneously with said contacts, the connection between said damper means and said master control effecting a predetermined positioning of said damper means in each of said positions of said master control, whereby movement of said master control into each of its said positions determined by the motion restraining means of said switch relates in a correlated operation of said switch and said damper means to cause a different conditioning effect to be applied to said room.

24. In an air conditioning unit having electrically driven blower and compressor means, a plurality of dampers for controlling the air flow and switch means for controlling said electrically driven means, means for operating said dampers and said switch means comprising a rotatable master control shaft, a second rotatable shaft, said switch means being operated by one of said shafts, a first gear mounted on said control shaft, a second gear mounted on said second shaft and meshing with said first gear to be turned thereby upon the rotation of said control shaft, a pair of links pivoted together at their one ends and pivoted to separate ones of said gears at their other ends, and means including a member attached to said links at their said one ends for operating said dampers whereby upon rotation of said control shaft in either direction said dampers and said switch are simultaneously operated by the rotation of said gears.

25. The combination of claim 23 including motion restraining means cooperating with one of said shafts for releasably retaining said one shaft and thereby the other shaft and said dampers in a plurality of predetermined positions.

References Cited in the file of this patent
UNITED STATES PATENTS

| | | |
|---|---|---|
| 2,343,121 | Eberhart | Feb. 29, 1944 |
| 2,408,972 | Eberhart | Oct. 8, 1946 |